Aug. 22, 1939.  D. W. VOORHEES  2,170,522
AXLE STRUCTURE-STEEL FARM TRUCK
Filed Aug. 29, 1936
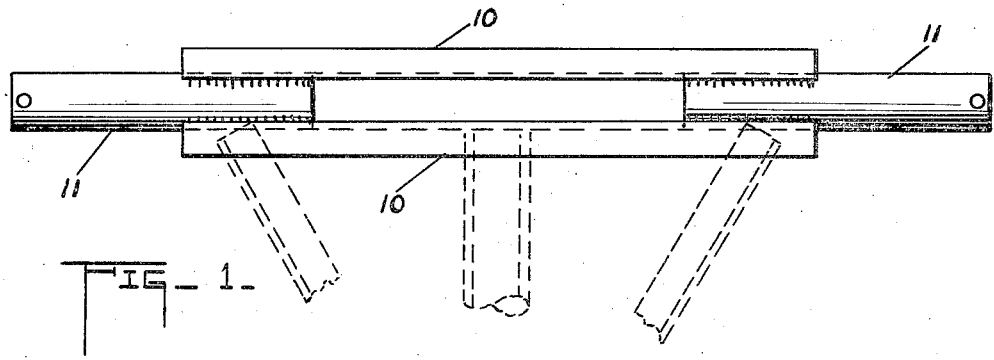
FIG-1.
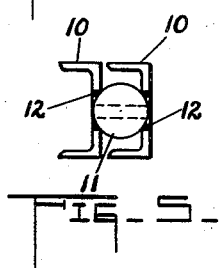
FIG-3.
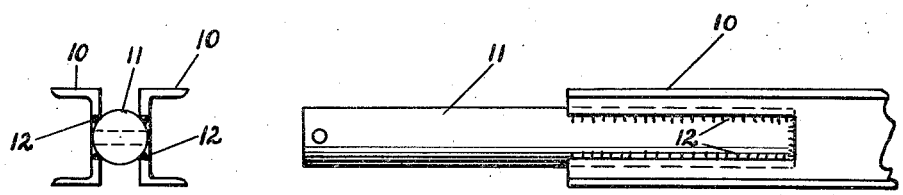
FIG-2.
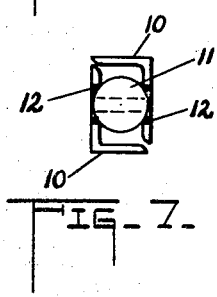
FIG-5.
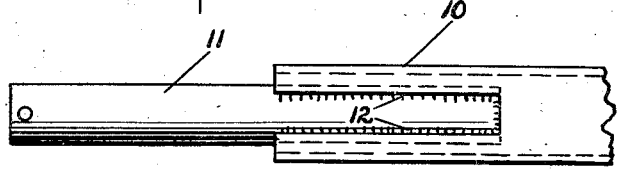
FIG-4.
FIG-7.
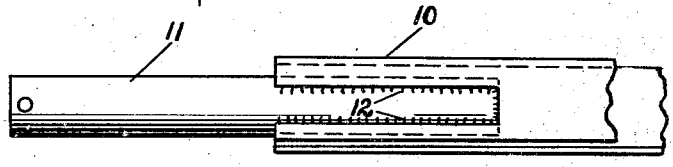
FIG-6.
INVENTOR
Daniel W. Voorhees
BY Tefft & Tefft
ATTORNEYS Patented Aug. 22, 1939

2,170,522

UNITED STATES PATENT OFFICE 2,170,522

AXLE STRUCTURE—STEEL FARM TRUCK

Daniel W. Voorhees, Peru, Ill.

Application August 29, 1936, Serial No. 98,553

7 Claims. (Cl. 301—132)

This invention relates to the structure of a steel axle for farm trucks or wagons.

The particular object of the invention is to provide a strong and durable axle structure consisting of the fewest possible number of component parts, all of these parts being simple and sturdy in form.

Another object is to provide a structure whereby a strong durable axle composed of the fewest number of simple sturdy parts can be assembled into a complete axle by a minimum of welding, said welding being exposed and easily accessible for the welding operation so that a strong sound weld can be easily made.

A still further object is to provide an axle structure wherein the stresses on the axle are not completely taken on any welded section but are resisted by the mechanical arrangement and structure of the parts.

Other objects and benefits will be disclosed by the accompanying descriptions and drawing of which—

Fig. 1 is a plan view of a steel axle for a steel farm truck showing the attachment of the rear hound and the reach pipe; and, Fig. 2 is a plan view of one end of an axle, the cross members of which are composed of two structural steel channels and the axle bearing of a round piece of steel; and, Fig. 3 is an end view of the axle shown in Fig. 2; and, Fig. 4 is a plan view of one end of an axle, the cross members of which are also composed of two structural steel channels, the legs of which extend in the same direction and the axle proper is composed of a round piece of steel; and, Fig. 5 is the end view of the axle shown in Fig. 4; and, Fig. 6 is a plan view of one end of an axle, the cross members of which are composed of two angle irons and the axle proper of a round piece of steel; and, Fig. 7 is the end view of the axle shown in Fig. 6.

My steel axle for farm trucks and wagons is a novel combination of elements wherein 10 shows the cross members of the axle. 11 is a round section of steel or the axle spindle proper. Now this member 11 can be made in a number of forms, that is, it may be turned in steps to provide rollers for the mounting of ball or roller bearings, the outside end may be tapered as an ordinary axle skein or any other shape to provide a proper bearing for a weld. It further may be made of only tough heat treated steel with the bearing proper being taken on roller bearings or the like, or it may be made of hardened steel to take directly the load of a plain bearing, or a roller bearing. In any of these materials the axle may be welded into the cross members without any practical effect on the collar of the axle.

It will be noted that all of the cross members of my axle are provided with an elongated rectangular slot 12 in the outer end of the cross member. It will be further noted that this slot 12 is of such size and shape as to fit the axle 11 and make a line contact with it along the full edge of the inner end of the axle. This is an important feature of my design because it will be noted first that the slot actually does support the end of the axle when it is held in position contacting the axle. It will further be noted that in every case the slot 12 provides easily accessible triangular openings between the round axle and the cross member which are ideal for the application of the weld, both from the standpoint of providing easy access for the welding operation, and also because the welds are placed in a strong structural position. These slots 12 are also advantageous in accurately placing the round axles in proper alignment with the cross members.

In Figs. 2 and 3 I have shown the cross members as structural steel channels with the legs extending in opposite direction. This is because of the benefits as above claimed.

However, in Figs. 4 and 5, I have shown the cross members as structural steel channels with the legs pointing in the same direction, and it will be noted that this arrangement also gives all of the benefits claimed.

Likewise, in Figs. 6 and 7, I have shown my axle composed of two structural steel angle irons and it will be perceived that this arrangement retains all of the benefits claimed.

There may be other arrangements of structural steel members similar to the above, and I do not wish to be limited to the particular structure shown, except as specified in my claims.

What I now claim as new is:

1. In a steel axle for farm trucks and the like, a pair of structural steel members, each having a slot extending longitudinally thereof for a substantial distance from one end of each, said slots being at adjacent ends of said structural members and said members being disposed in adjacent and spaced and substantially coextensive relationship to one another, and an axle member of substantially circular cross-section having one end portion disposed between said adjacent ends of said structural members, said end portion being of a diameter greater than the width of either slot, said end portion being engaged with and welded to said structural members along the margins of said slots.

2. In a steel axle for farm trucks and the like, a pair of structural steel members disposed alongside of one another in spaced and substantially parallel relation and with their respective ends adjacent, each of said members being slotted at adjacent ends with the slots extending longitudinally of the members for a substantial distance, and an axle spindle having a portion disposed between said members and at the free end thereof abutting and welded to the structural members at the ends of said slots, said portion being engaged with the longitudinal margins of the slots substantially throughout the lengths of the slots and being welded to said members along said slot margins.

3. In a steel axle for a farm truck or wagon, substantially parallel and opposed structural steel units arranged relatively to each other to define a space having parallel side walls, there being slots extending longitudinally of said units having their mouths in the ends thereof, and axle members abutting the longitudinal walls of the slots along the opposed faces of said units and projecting in part into said slots and welded to said units along the longitudinal walls of said slots.

4. An axle composed of a pair of parallel spaced apart plates, two pieces of shafting of appreciably smaller diameter than the width of said plates and of greater diameter than the space between the same and disposed to lie in part between end portions of said plates and in part projecting outwardly beyond the ends of said plates, the latter equipped in their end portions with longitudinal slots of less width than the diameter of said shafting, arcuate surface portions of the latter projecting into said slots, said pieces of shafting being welded to the longitudinal walls of said slots.

5. An axle comprising a pair of axially aligned pieces of shafting spaced from each other, a pair of parallel plates of less length than the distance separating the outer extremities of said pieces of shafting and overlapping the inner opposed end portions of the latter, there being opposed longitudinal slots in the outer end portions of said plates of less width than the diameter of said shafting and receiving the inner end portions thereof and having their longitudinal walls welded to the contacting portions of said pieces of shafting, whereby the spacing apart of said plates is less than the diameter of said shafting, the said pieces of shafting constituting means for coupling said plates and maintaining the latter in their predetermined relative positions, said plates equipped with longitudinally disposed reinforcing formations.

6. An axle comprising a pair of parallel spaced apart equal plates provided in their end portions with opposed longitudinal recess formations disposed substantially midway between the longitudinal edges of said plates and adapted to receive diametrically opposed portions of the inner end portions of lengths of shafting, and a pair of lengths of shafting of greater diameter than the width of said recess formations disposed along diametrically opposed portions within the latter and welded to said plates along the longitudinal edges of said recess formations thereby to join said plates, the lines of welding being spaced substantially equidistantly from each other circumferentially of said lengths of shafting.

7. In a steel axle, two flanged structural steel units together forming a cross member, said units having flat wall portions arranged in parallel opposed and spaced relation to each other, slots extending inwardly longitudinally from the ends thereof, said slots being at corresponding ends, and axle members fitted to project in part into said slots along the inner corners of the longitudinal walls of the slots and welded thereto.

DANIEL W. VOORHEES.